US007635096B2

(12) United States Patent
Wright et al.

(10) Patent No.: US 7,635,096 B2
(45) Date of Patent: Dec. 22, 2009

(54) SELF REGULATING FLUID BEARING HIGH PRESSURE ROTARY NOZZLE WITH BALANCED THRUST FORCE

(75) Inventors: Douglas E. Wright, Durango, CO (US); John E. Wolgamott, Durango, CO (US)

(73) Assignee: StoneAge, Inc., Durango, CO (US)

( * ) Notice: Subject to any disclaimer, the term of this patent is extended or adjusted under 35 U.S.C. 154(b) by 0 days.

(21) Appl. No.: 11/208,225

(22) Filed: Aug. 19, 2005

(65) Prior Publication Data

US 2007/0257132 A1 Nov. 8, 2007

(51) Int. Cl.

| | |
|---|---|
| ***B05B 3/06*** | (2006.01) |
| ***B05B 3/02*** | (2006.01) |
| ***F16J 15/34*** | (2006.01) |
| *B08B 3/00* | (2006.01) |

(52) U.S. Cl. .................... 239/259; 239/225.1; 239/251; 134/198; 277/388; 277/401

(58) Field of Classification Search ................. 239/259, 239/225.1, 251, 246, 252, 254, 256, 257, 239/261, 264, 397, 598, DIG. 8; 134/198, 134/172, 179; 277/388, 401, 377, 387, 403, 277/408, 409, 411; 415/80

See application file for complete search history.

(56) References Cited

U.S. PATENT DOCUMENTS

| | | | | |
|---|---|---|---|---|
| 5,456,413 | A * | 10/1995 | Ellis | 239/259 |
| 5,531,383 | A * | 7/1996 | Pacht | 239/251 |
| 5,685,487 | A * | 11/1997 | Ellis | 239/261 |
| 6,027,040 | A * | 2/2000 | Frye-Hammelmann | 239/252 |
| 6,059,202 | A * | 5/2000 | Zink et al. | 239/259 |
| 6,698,669 | B2 * | 3/2004 | Rieben | 239/225.1 |
| 7,201,238 | B2 * | 4/2007 | Marvin et al. | 175/67 |

* cited by examiner

*Primary Examiner*—Darren W Gorman
(74) *Attorney, Agent, or Firm*—Kenton L. Freudenberg

(57) ABSTRACT

A high pressure rotary nozzle having a rotating shaft operating within a fixed housing wherein the of axial force which acts upon the shaft due to the liquid pressure at the shaft inlet is balanced by allowing passage of a small amount of the pressurized liquid to be bled to an area or chamber between the outside of the opposite end of the shaft and the inside of the housing where the liquid pressure can act axially in an opposing direction upon the shaft to balance the axial inlet force. The balance of axial forces is self-regulating by controlling escape of the liquid through a tapered or frusto-conical region between the shaft and housing. This further provides a liquid bearing between the two surfaces and allows use of interchangeable rotating jet heads having jet orifices which can be oriented in virtually any desirable configuration including axially forward of the nozzle.

6 Claims, 2 Drawing Sheets

SELF REGULATING FLUID BEARING HIGH PRESSURE ROTARY NOZZLE WITH BALANCED THRUST FORCE

BACKGROUND OF THE INVENTION

The present invention provides a simplified and reliable construction for a high-pressure rotating water jet nozzle which is particularly well suited to industrial uses where the operating parameters can be in the range of 1,000 to 40,000 psi, rotating speeds of 10,000 rpm or more and flow rates of 2 to 50 gpm. Under such use the size, construction, cost, durability and ease of maintenance for such devices present many problems. Combined length and diameter of such devices may not exceed a few inches. The more extreme operating parameters and great reduction in size compound the problems. Pressure, temperature and wear factors affect durability and ease of maintenance and attendant cost, inconvenience and safety in use of such devices. Use of small metal parts and poor quality of materials in such devices may result in their deterioration or breakage and related malfunctioning and jamming of small spray discharge orifices or the like. The present invention addresses these issues by providing a simplified construction with a greatly reduced number of parts and a design in which net operating forces on nozzle components are minimized.

SUMMARY OF THE INVENTION

This invention is intended for to provide a nozzle for use in a high pressure (HP) range of approximately 1,000 to 40,000 psi having a "straight through" liquid path to a jet head at an end of the device where the head is capable of providing rotating coverage of greater than hemispherical extent, including the area directly along the axis of rotation of the device. In a typical nozzle assembly the internal forces resulting from such operating pressures tend to create an axial thrust force acting against the nozzle shaft with the force corresponding to the operating pressure and cross sectional area of the shaft. An example of a prior art device using mechanical bearings is shown in Applicants' prior U.S. Pat. No. 6,059,202. This prior art device provides the benefit that pressurized operating liquid can take a "straight through" from the inlet for the liquid source to the nozzle head. However, in this device the rotating nozzle shaft is supported against the internal axial thrust forces by a series of stacked bearings, with plural bearings being used to bear the relatively high thrust load without increasing the diameter of the device. In such devices the mechanical bearings have been used to serve as both radial and thrust bearings, however the size and/or quantity of such bearings has been dictated primarily by the need to resist thrust forces.

It has generally been considered desirable to keep the diameter of any rotating portions of a nozzle smaller than the largest diameter of such a nozzle so that contact between the rotating portions and any surface being cleaned is minimized thereby minimizing abrasive wear to the nozzle and interference with the rotational movement of the nozzle jets. Other prior art devices have used nozzles which rotate around a central tube which provides the liquid source. However for the aforementioned reason, such devices, while being able to provide a cylindrical path of coverage with their rotating bodies, have not been well adapted to both providing a rotating coverage which can include a path very close to the rotational axis of the device and an "straight-through" liquid path.

In contrast the device of the present invention provides a much simplified structure which also provides a straight-through liquid path in which the pressure of the operating fluid is also allowed to reach and act upon opposing surfaces of the rotating nozzle shaft so as to effectively balance any axial thrust force. Further a small detachable jet head having a diameter smaller than the body of the nozzle can be attached at the leading end of the nozzle to provide an improved coverage pattern for the high-pressure liquid. This is accomplished by providing a "bleed hole" to allow a small portion of pressurized liquid to reach a chamber or channel within the housing but outside the exterior of the forward portion of the nozzle shaft where the liquid pressure can act upon the nozzle shaft with a sufficient axial component so as to balance the corresponding axial component against the nozzle shaft created by the internal liquid pressure. This chamber or channel communicates with the exterior of the device by means of a slightly tapered frusto-conical bore surrounding a corresponding tapered portion of the shaft which further allows the fluid to flow between the body and the shaft to facilitate or lubricate the shaft rotation.

Because of the tapered shape, the spacing between the housing and the shaft varies slightly with axial movement of the shaft and creates a "self balancing" effect in which the axial forces upon the shaft remain balanced and there is always some liquid flowing between the shaft and housing which helps decrease contact and resulting wear between these two components. Due to the lack of any significant imbalanced radial forces and the fluid flowing between the surfaces of the shaft and housing, a device of the present invention can be constructed without additional mechanical bearings.

Among the objects of the invention is to simplify the configuration of moving parts of a small high pressure spray nozzle to reduce the cost, number of parts and facilitate economical manufacture and replacement of the wearable parts.

Another object of the invention is to provide improved operation of rotatable high pressure nozzles by improving the configuration of the bearing parts and eliminating use of mechanical bearings heretofore used to resist high axial forces generated by the liquid pressures usually involved.

Another object of the invention is to help achieve a small durable light weight elongated and small diameter rotating high pressure spray nozzle assembly which can be conveniently carried on the end of a spray lance and readily inserted into small diameter tubes and the like to clean the same as well as being usable on other structures or large flat areas.

Another object of the invention is to provide a rotating high pressure jet in which the need for ongoing maintenance is minimized.

Another object of the invention is to provide a rotating nozzle in which forces acting upon the rotating shaft from the operating liquid are balanced to eliminate the need for separate mechanical thrust bearings.

Another object of the invention is to provide a rotating nozzle which is simple and mechanically reliable when operated at very high pressures and in very small diameters such as those required for cleaning heat exchanger tubes.

Another object of the invention is to provide a rotating nozzle in which rotating shaft is supported and lubricated by the operating liquid without need for separate mechanical bearings or separate lubricant.

A further object of the invention is to provide a rotating nozzle for use with a high pressure liquid without the need for tight mechanical seals between relatively rotating parts.

A further object of the invention is to provide a rotating nozzle for use with a high pressure liquid in which jet heads of varying configurations are readily interchangeable.

Another object of the invention is to provide a nozzle with small detachable jet head having a diameter smaller than the body of the nozzle and which can provide an unrestricted spray in a path including a forward axial direction.

DETAILED DESCRIPTION OF THE INVENTION

Figure 2:
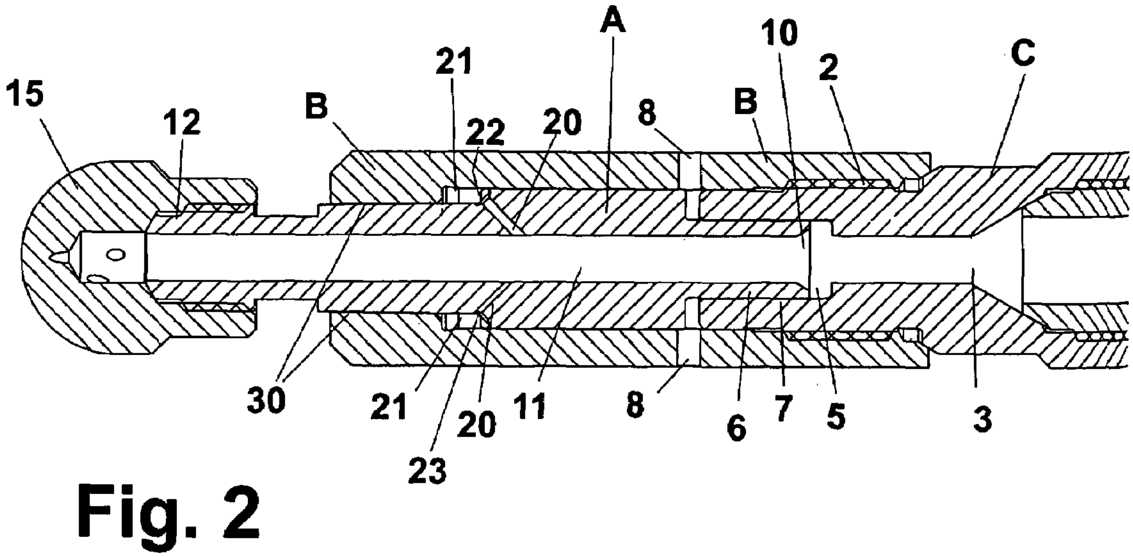
FIG. 2 is a cross-section of the nozzle of an alternative embodiment in which the balancing chamber is separate from the tapered regulator passage.

As can be seen most clearly in FIG. 2, the present invention allows a simple three-piece rotary nozzle structure. A hollow cylindrical rotary shaft A is contained in a housing or body comprised of an inlet portion C and an outlet portion B. The housing portions are secured together and sealed using threading or other similar fastening means 2 which allows assembly and disassembly of the device including allowing shaft A to be really inserted or removed. The inlet portion C provides an inlet 3 for high-pressure liquid fed to the device by hose or other similar means attached to the inlet by any suitable means, most commonly a mated threaded fitting. A suitable material for each of the nozzle portions will have fairly high strength and resistance to galling, for example, any of various high nickel stainless steels. A surface treatment or plating may be used for any known benefits such as lubricity or abrasion resistance.

At the opposite end of the housing inlet portion is a cylindrical cavity 5 which receives the inlet end 6 of the rotating shaft A. The annular interface 7 between the housing and shaft is sized so as to minimize leakage while still allowing rotation of the shaft A with a slight cushion of liquid. Typically the gap of the interface 7 will be approximately 0.0025" to 0.0005". Some passage of liquid at the interface 7 is desirable in order to allow a liquid layer to facilitate the rotating movement between the shaft A and body portion B. Elimination of the need of a seal at interface 7 reduces manufacturing expense and complexity in providing such a seal. Body portion B is provided with radial “weep” holes 8 to the exterior for escape of liquid passing the interface 7 or other paths along the exterior of shaft A.

The shaft inlet 10 is open to the cavity 5 to of provide direct flow of liquid into the central of bore 11 of the shaft A. Under normal operation the pressurized liquid exerts an axial force on the inlet end 6 of shaft A which will be referred to herein as the “input force.” This force is directly proportional to (1) the area of the inlet end 6 perpendicular to the direction of liquid flow and (2) the pressure of the liquid. It is this axial force which the present invention is intended to counteract with an equal opposing force.

As the liquid enters the shaft most of the liquid will pass through the central bore of the shaft to exit through the nozzle head 15 attached to the outlet end 12 of the shaft. Head 15 will typically be provided with exit holes or orifices 16 positioned to direct high pressure liquid toward a surface to be cleaned and oriented to impart a reactive force to rotate the head and shaft.

A significant feature which eliminates the need for dedicated thrust bearings is the provision of one or passages 20 which communicate between the central bore 11 of the shaft and a chamber 21 defined between the outer surface of shaft A and the inner surface of the housing portion B and having an outlet with sufficient restriction to retain liquid pressure within the chamber.

Passage or passages 20 are ideally configured to allow the pressurized liquid to reach chamber 21 with minimal restriction to allow sufficient pressure to be achieved within chamber 21 so as to act upon the annular surface of the shaft created by the stepped shoulder portion 22. The stepped shoulder portion 22 has a surface 23 which is directly perpendicular to the axis of the device. Liquid pressure acting upon this surface creates a thrust force (which will be designated herein as the “resistive force”) having a net axial component acting upon the shaft which is opposed to and capable of countering the input force described previously.

Figure 3:
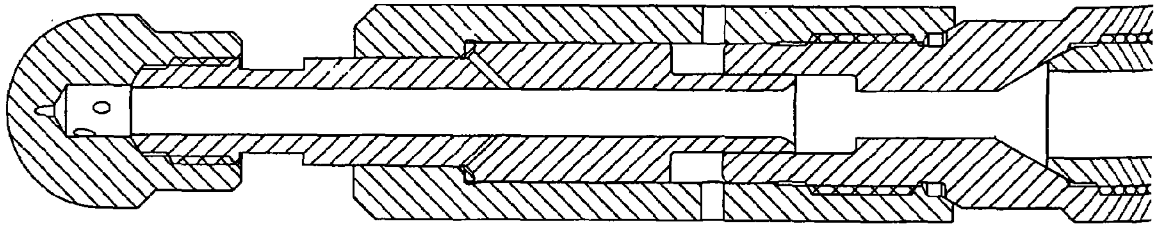
FIG. 3 is a cross-section corresponding to FIG. 2 showing the shaft in a slightly different axial position.

In the embodiment shown in FIGS. 2 and 3 suitable dimensions are a shaft diameter 0.182" at inlet 10, an outer and inner diameters of 0.326" and 0.257" respectively of chamber 21. The corresponding angle of taper of both shaft and housing along gap 30 is 0.57 degrees, with the housing inner diameter tapering from 0.257" to 0.250" over the length of the taper.

In order that the input and resistive forces may remain balanced the chamber 21 is provided with an outlet and regulator passage along the path defined by the narrow frusto/conical gap 30 between correspondingly shaped portions of shaft A and housing portion B. The tapered configuration allows variation in the size of the gap as the shaft moves axially with respect to the housing. For example, the width of gap 30 may vary, being approximately 0.0001" as the shaft A is positioned toward the jet head shown in FIG. 2. As the shaft moves to the position toward the inlet shown in FIG. 3, the width of gap 30 may open to approximately 0.001". A larger gap allows greater escape of pressurized liquid resulting in corresponding decrease in the resistive force acting upon the shaft. Conversely, a smaller gap allows an increase of pressure. Any imbalance between the and input and resistive forces tends to cause some axial movement of the shaft, which increases or reduces changes the gap in a manner which tends to re-balance these opposing forces. Accordingly, a state of equilibrium is reached where the input and resistive forces remain dynamically balanced.

Figure 1:
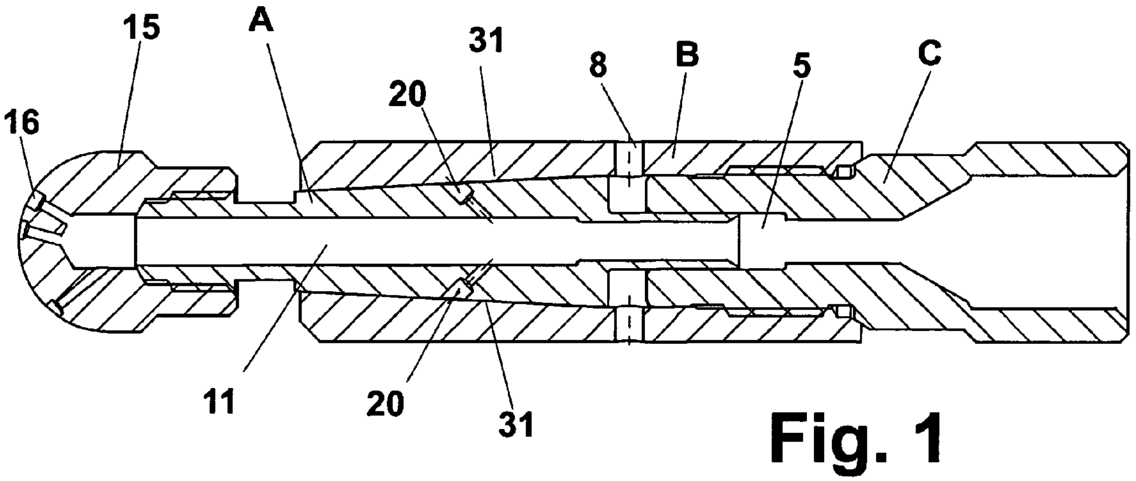
FIG. 1 is a cross-section of the nozzle of the preferred embodiment in which a tapered regulator passage also serves as a balancing chamber.

The preferred embodiment of the present invention is shown in FIG. 1 in which the functional features described are combined and provided in a simplified structure. For there to be an axial resistive force it is unnecessary that there be a surface which is actually perpendicular to the shaft axis as described above so long as there is a surface with an areal component which is effectively perpendicular to the rotational axis. In the simplified structure shown in FIG. 1 the port from the shaft bore 11 communicates directly with the tapered outlet passage 31, which serves the dual function of being a balancing chamber, where a balancing resistive force is created and a regulator passage, to control the amount of pressure which created the resistive force. Since a force acting at any point on the frusto-conical surface imparts both a radial force and an axial force, the total of such forces over the surface create a net axial force and with no net radial force. The following table illustrates suitable dimensions in inches for various parameters for flows between 8 and 50 gallons per minute using the tapered design of the preferred embodiment

| | Design flow: | | | |
|---|---|---|---|---|
| | 8 gpm | 15 gpm | 35 gpm | 50 gpm |
| Inner diameter thru tool (determines flow capacity) | 0.096 | 0.150 | 0.240 | 0.300 |
| (inlet end of shaft diameter) | 0.1410 | 0.220 | 0.345 | 0.430 |
| (largest shaft diameter) | 0.3250 | 0.506 | 0.750 | 0.840 |
| (shaft diameter @ small end of taper) | 0.2530 | 0.375 | 0.560 | 0.560 |
| (inlet inside diameter) | 0.1420 | 0.221 | 0.346 | 0.431 |
| (body inside diameter -large end of taper) | 0.3250 | 0.506 | 0.750 | 0.840 |
| (body inside diameter -small end of taper) | 0.2535 | 0.376 | 0.561 | 0.561 |
| (length of inlet end of shaft) | 0.260 | 0.260 | 0.260 | 0.260 |
| (length of taper) | 0.7450 | 1.242 | | |

In accordance with the features and benefits described herein, the present invention is intended to be defined by the claims below and their equivalents.

What is claimed is:

1. A nozzle assembly for spraying high pressure cleaning liquid against an object to be cleaned and comprising:

a hollow cylindrical housing body, a hollow tubular shaft member rotatable coaxially within the housing body and having a liquid inlet end within and near one end of said housing body, said shaft member having an outlet end near a second end of the housing body and including means at said outlet end for securing a spray head for rotation with the shaft, said shaft member having a central passage to conduct liquid from said inlet end to said outlet end, said body having a high pressure liquid inlet passage communicating with said central passage of said shaft, a regulating passage in the form of an outlet chamber formed between said housing body and said shaft near said outlet end of said shaft, passage means near said outlet end and communicating between the central passage of the shaft and a pressure cavity formed between an inner wall of the housing body and a portion of the outer surface of the shaft member, wherein said portion of the outer surface of said shaft comprises a surface area having an areal component perpendicular to the axis of said shaft, wherein pressure of said cleaning liquid within said chamber acts axially upon said shaft to counter axial force on said shaft resulting from liquid pressure acting upon said inlet end of said shaft.

2. A nozzle assembly according to claim 1 wherein said regulating passage is a tapered frusto-conical gap defined between said tubular shaft and said housing body.

3. nozzle assembly according to claim 2 wherein said regulating passage and said pressure cavity are the same a tapered frusto-conical gap.

4. A nozzle assembly according to claim 2 wherein the volume of said regulating passage is variable as said tubular shaft moves axially within said housing body.

5. A nozzle assembly according to claim 4 wherein during pressurized operation of the nozzle, axial forces on said tubular shaft reach equilibrium, so that there is no axial contact between said tubular shaft and said housing body.

6. A nozzle assembly according to claim 5 wherein during pressurized operation of the nozzle, said tubular shaft is supported within said housing entirely by a flow of operating liquid between said shaft and said housing.

* * * * *

UNITED STATES PATENT AND TRADEMARK OFFICE

CERTIFICATE OF CORRECTION

PATENT NO. : 7,635,096 B2
APPLICATION NO. : 11/208225
DATED : December 22, 2009
INVENTOR(S) : Douglas E. Wright and John E. Wolgamott It is certified that error appears in the above-identified patent and that said Letters Patent is hereby corrected as shown below:

Title Page, Item (57), the Abstract, line 2: remove “of” after “wherein the”;

Column 1, line 58: insert --or eliminated-- before “thereby”;

Column 3, line 24: insert --two part-- after “contained in a”;

Column 4, line 28: insert --or cavity-- after “chamber”;

Column 4, line 59: insert --or cavity-- after “chamber”;

Column 6, line 20, claim 3: insert --A-- before “nozzle”.

Signed and Sealed this

Twentieth Day of April, 2010

David J. Kappos

David J. Kappos
*Director of the United States Patent and Trademark Office*